July 27, 1926.

Re. 16,398

R. D. METCALFE ET AL

EXHAUST STEAM INJECTOR

Original Filed Nov. 5, 1923 9 Sheets-Sheet 1

INVENTORS
R. D. METCALFE
J. C. METCALFE
By Marks & Clerk
ATTORNEYS

July 27, 1926.

R. D. METCALFE ET AL

Re. 16,398

EXHAUST STEAM INJECTOR

Original Filed Nov. 5, 1923 9 Sheets-Sheet 2

INVENTORS
R. D. METCALFE
J. C. METCALFE
By Marks & Clerk
ATTORNEYS

July 27, 1926.

Re. 16,398

R. D. METCALFE ET AL

EXHAUST STEAM INJECTOR

Original Filed Nov. 5, 1923 9 Sheets-Sheet 3

INVENTORS
R.D. METCALFE
J.C. METCALFE
By Marks & Clerk
ATTORNEYS

July 27, 1926.

Re. 16,398

R. D. METCALFE ET AL

EXHAUST STEAM INJECTOR

Original Filed Nov. 5, 1923 9 Sheets-Sheet 4

INVENTORS
R.D. METCALFE
J.C. METCALFE
By Marks & Clerk
ATTORNEYS

July 27, 1926.
Re. 16,398
R. D. METCALFE ET AL
EXHAUST STEAM INJECTOR
Original Filed Nov. 5, 1923 9 Sheets-Sheet 5
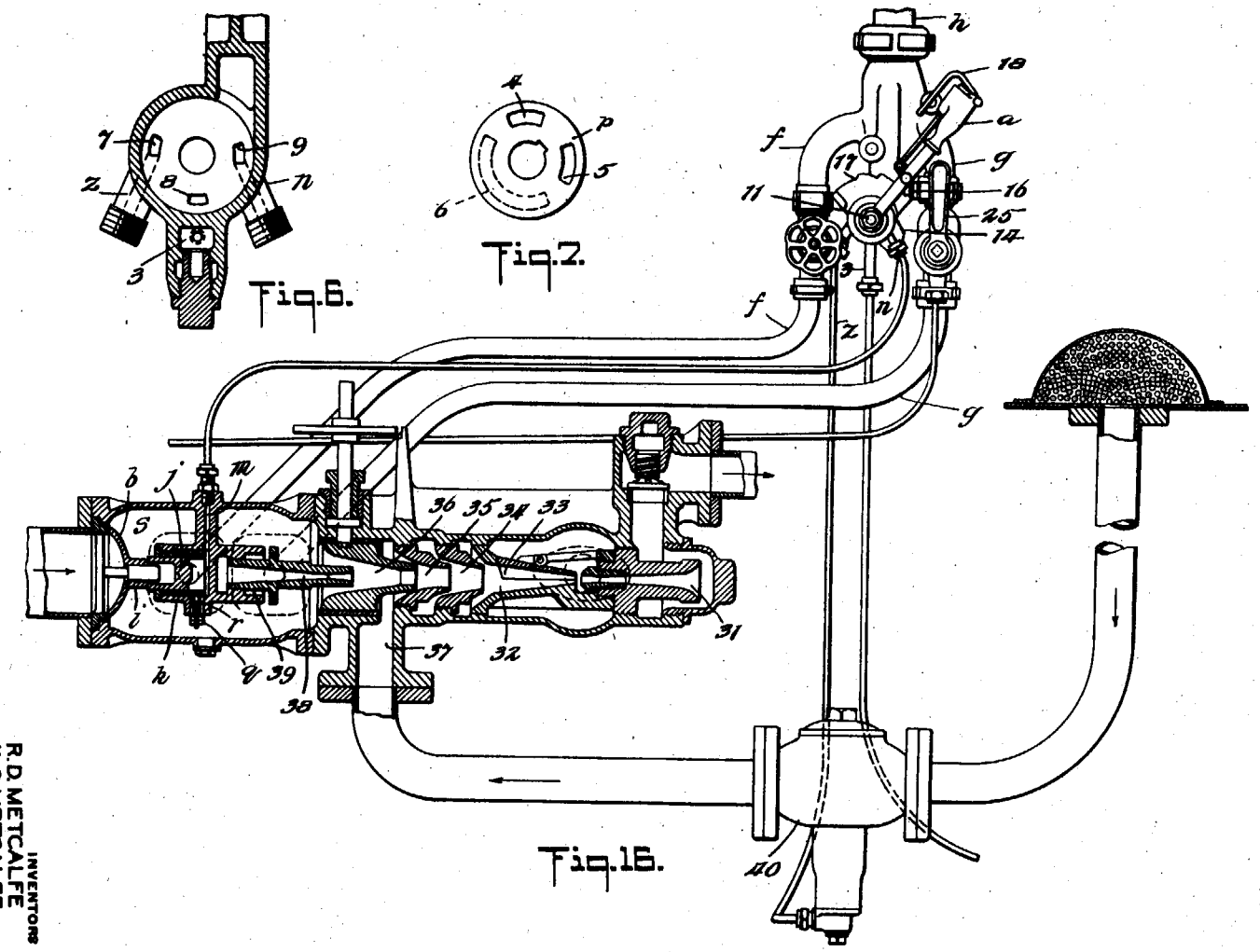
INVENTORS
R. D. METCALFE
J. C. METCALFE
By Marks & Clark
ATTORNEYS July 27, 1926.

R. D. METCALFE ET AL

Re. 16,398

EXHAUST STEAM INJECTOR

Original Filed Nov. 5, 1923 9 Sheets-Sheet 6

INVENTORS
R. D. METCALFE
J. C. METCALFE
By Marks & Clerk
ATTORNEYS

July 27, 1926.

Re. 16,398

R. D. METCALFE ET AL

EXHAUST STEAM INJECTOR

Original Filed Nov. 5, 1923 9 Sheets-Sheet 7

INVENTORS
R. D. METCALFE
J. C. METCALFE
By Marks & Clerk
ATTORNEYS

July 27, 1926.

R. D. METCALFE ET AL

Re. 16,398

EXHAUST STEAM INJECTOR

Original Filed Nov. 5, 1923 9 Sheets-Sheet 8

INVENTORS
R. D. METCALFE
J. C. METCALFE
By Marks & Clerk
ATTORNEYS

July 27, 1926.

Re. 16,398

R. D. METCALFE ET AL

EXHAUST STEAM INJECTOR

Original Filed Nov. 5, 1923 9 Sheets-Sheet 9

INVENTORS
R.D. METCALFE
J.C. METCALFE

By Marks & Clerk
ATTORNEYS

Reissued July 27, 1926. Re. 16,398

UNITED STATES PATENT OFFICE.

RICHARD DAVID METCALFE AND JAMES CROXON METCALFE, OF ROMILEY, ENGLAND.

EXHAUST-STEAM INJECTOR.

Original No. 1,510,999, dated October 7, 1924, Serial No. 672,981, filed November 5, 1923. Application for reissue filed May 26, 1926. Serial No. 111,895.

This invention relates to injectors worked by exhaust steam, or steam at about atmospheric pressure assisted by live steam when it is desired to raise the injector delivery pressure to an amount greater than that obtainable by the use of exhaust steam only.

The object of the present invention is to provide improved means for regulating or controlling the injector so that the operator can by suitable movements of one or more handles which can be placed close together and at a considerable distance from the injector, make all the adjustments necessary to obtain satisfactory working under all conditions.

The invention comprises the combination with an exhaust steam injector, of steam operated exhaust steam and water control valves arranged for remote control in proper sequence from a single handle or its equivalent.

The invention further comprises the combination with the single control handle, of means whereby it also controls the live steam supply to the injector for raising the delivery pressure of the latter.

The invention further comprises the combination with the control handle, of pilot and main steam valves operated from said handle for controlling the live steam supply to the injector.

The invention further comprises the combination with the control handle and with the means operated thereby for controlling the exhaust steam inlet valve of the injector, the water inlet valve and the live steam supply valve or valves, of a further valve operated by said handle and adapted to control the flow of steam to the means supplying to the injector live steam throttled down to about atmospheric pressure for working the injector when exhaust steam is not available.

Our invention further comprises the improved details of construction and arrangement hereinafter described and claimed.

Referring to the accompanying sheets of explanatory drawings:—

Figure 16 is a view illustrating an exhaust injector with our improved control arrangements applied thereto.

The same reference letters in the different views indicate the same or similar parts.

Referring in the first place to Figures 1 to 10, the handle *a* is adapted to control the opening and closing of the valve *b* (Figures 9 and 10) by which exhaust steam is allowed to pass into an injector, the valve *c* (Figure 8) by which water is admitted to the injector, the valve *d* and its pilot valve *e*, by which supplementary live steam is admitted to the injector by way of the passage *f* (Figures 2 and 4) when the steam is to pass into the injector under full boiler pressure so as to assist in raising the injector delivery pressure and in the form illustrated in Figures 11 to 15 by way of the passage *g* (Figures 11, 12 and 14) when the steam is to be throttled down so that it can act as auxiliary live steam in substitution of the exhaust steam when a supply of the latter is not available. The steam enters the control fitting at *h*.

Figure 9:
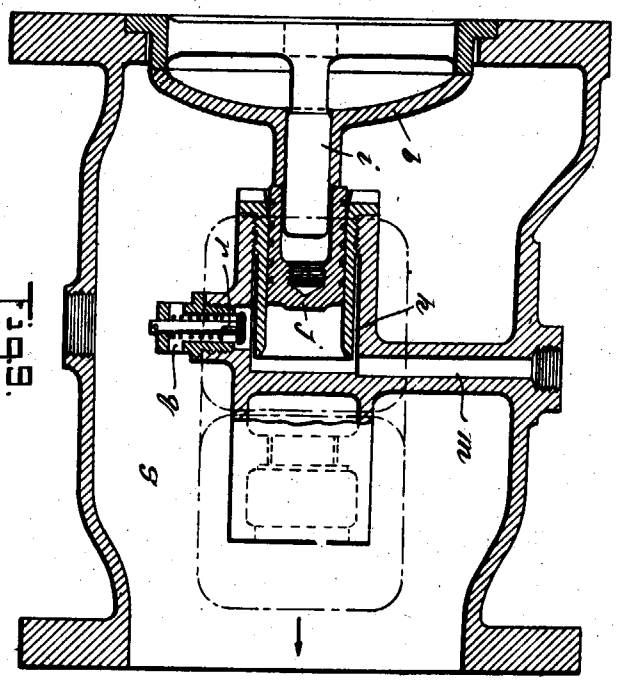
Figures 9 and 10 illustrate in sectional elevation, two arrangements controlled from the instrument shown in Figures 1 to 7 for regulating the admission of exhaust steam to the exhaust injector.

The valve *b*, Figure 9, slides upon a stem *i* and can abut against a piston *j* within a cylinder *k* to which steam is supplied by a passage *m* adapted to be placed in pipe communication with the connection *n* (Figures 2 and 6) of the control fitting. The supply of steam to the connection is obtained by way of the passage *o*, Figure 3, and the disc type valve *p*. A drain connection *q* with a valve *r* thereon which is held open by a light spring so that it closes immediately steam is admitted to the cylinder *k* from the passage *m* ensures the efficient draining of the said cylinder. The drainage merely passes into the main conduit *s* by which exhaust steam passes into the injector. The valve *b*, when not loaded by steam pressure acting on the piston *j*, opens by reason of the pressure of the exhaust steam acting thereon if a supply of such steam is available.

Figure 10:
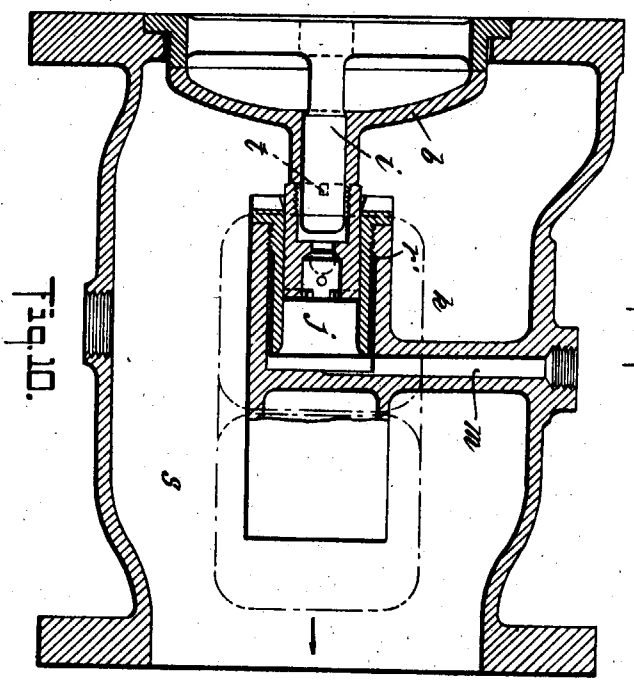
Figure 11:
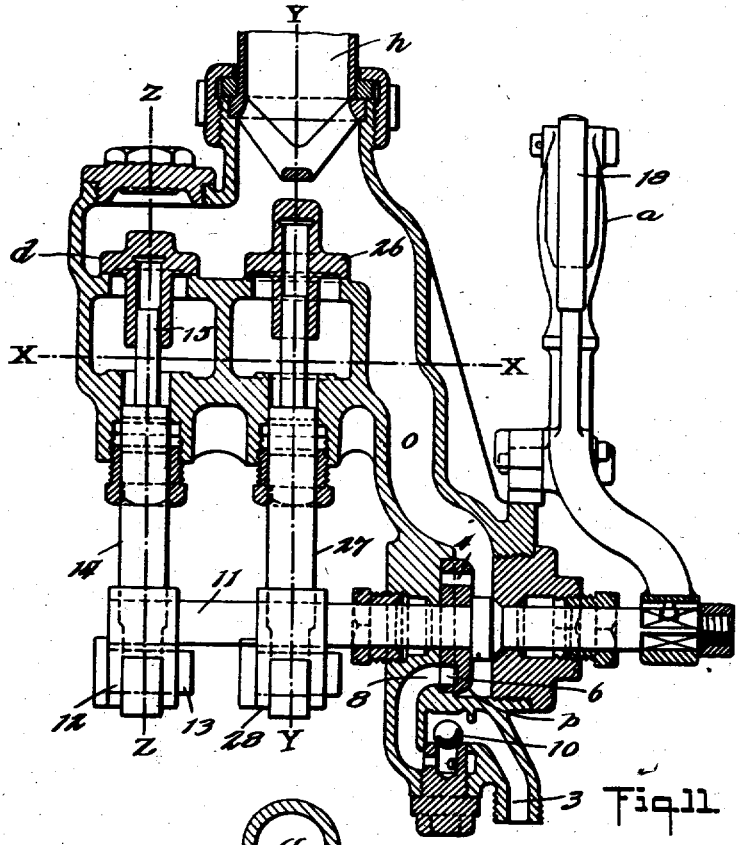
Figure 11 is a sectional side elevation.
Figure 12:
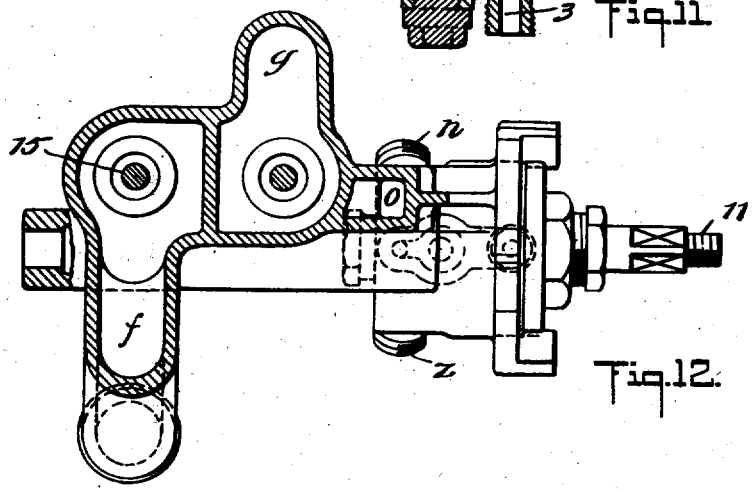
Figure 12 a sectional plan view on the line X X of Figure 11 and Figure 13 a front elevation of a modified construction of control fitting.
Figure 13:
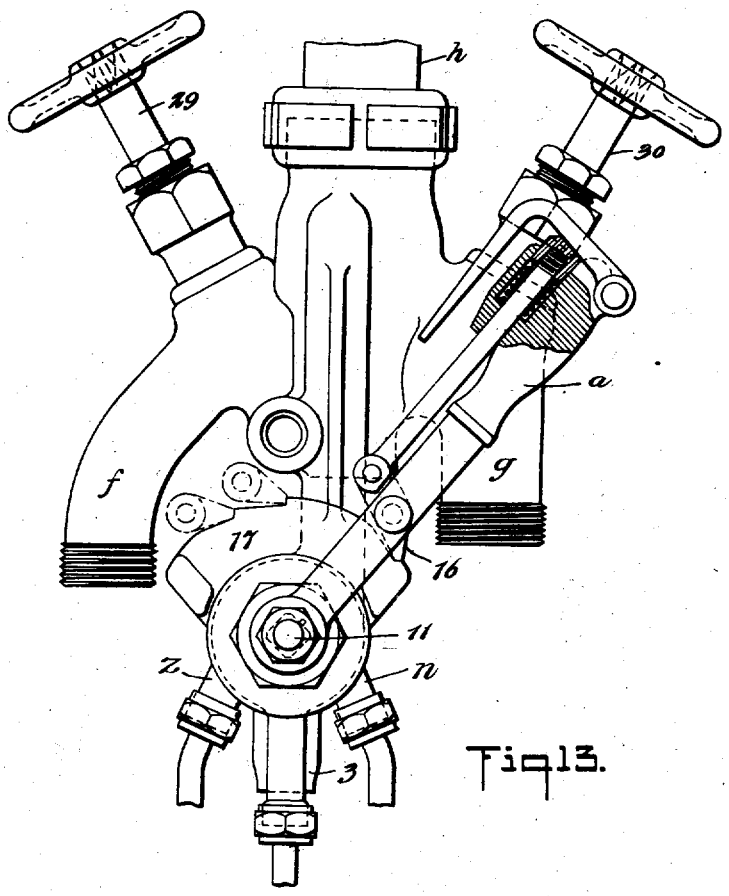
Figure 14:
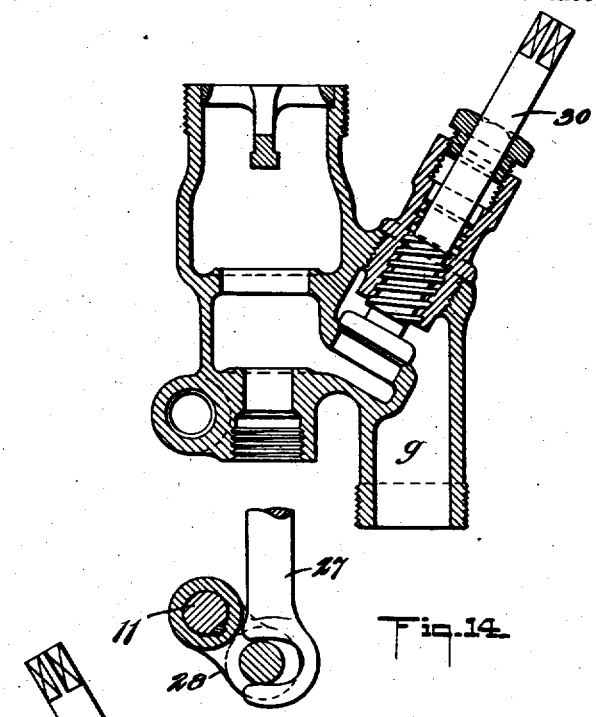
Figure 14 is a sectional end elevation on the line Y Y of Figure 11.
Figure 15:
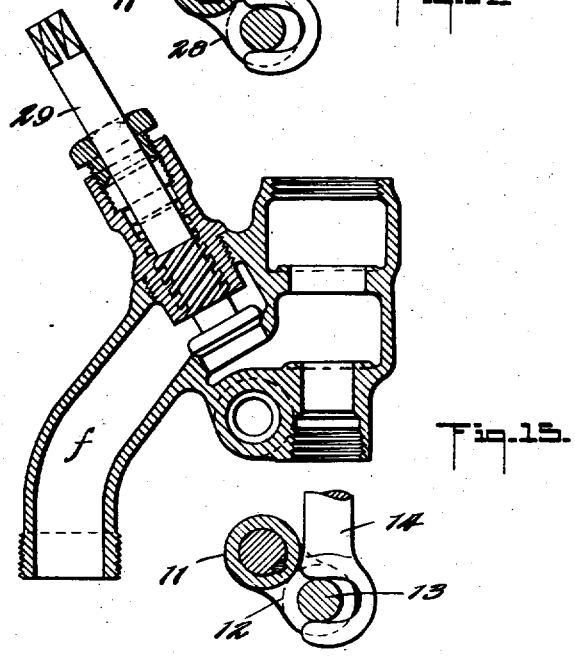
Figure 15 is a sectional end elevation on the line Z Z of Figure 11.

In the arrangement shown at Figure 10, a ball type drain valve *r'* is provided within the piston *j*, the drainage passing by way of the gaps *t* in the piston end into the exhaust steam passage *s*.

Figure 8:
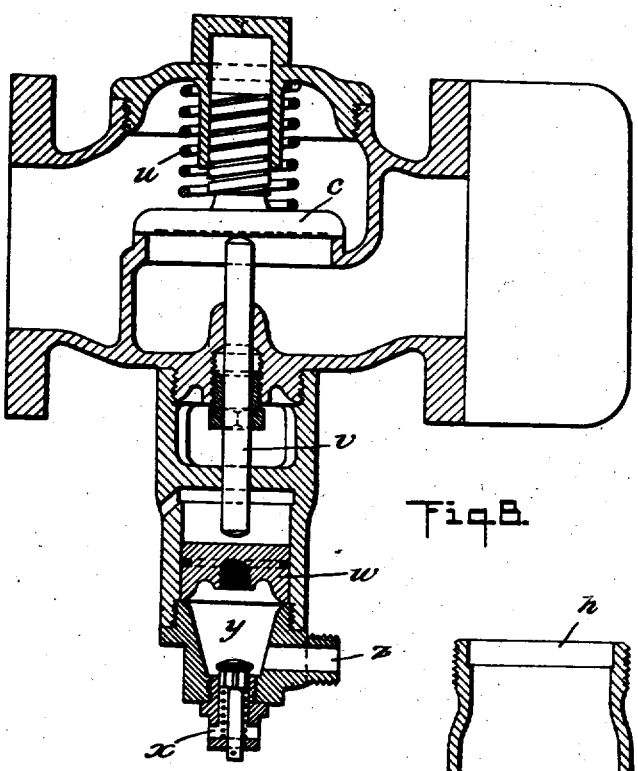
Figure 8 shows in sectional elevation the injector water inlet valve which is controlled from the instrument illustrated in Figures 1 to 7.
Figure 5:
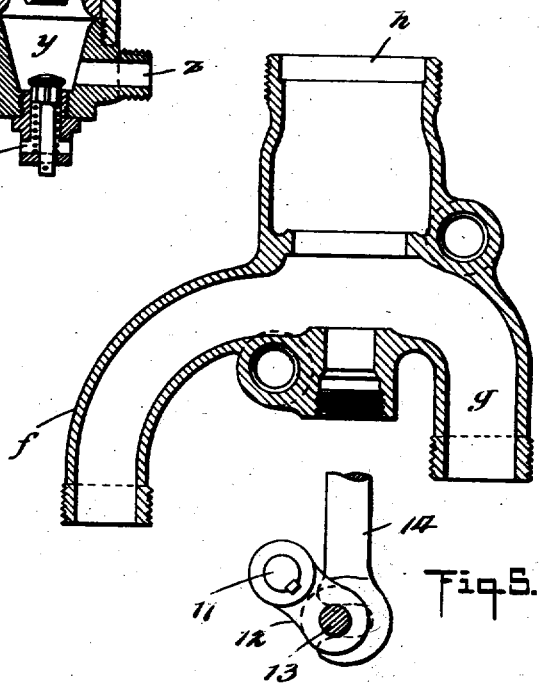

The water control valve *c*, Figure 8, is held on its seat by the spring *u* and opened by the pusher *v* when steam is admitted below the piston *w*. *x* is a drain connection for the chamber *y*. The steam supply to the underside of the piston *w* is obtained by way of the connection *z*, Figures 2 and 6. The control of the steam supply is effected by the disc valve *p*.

Figure 2:
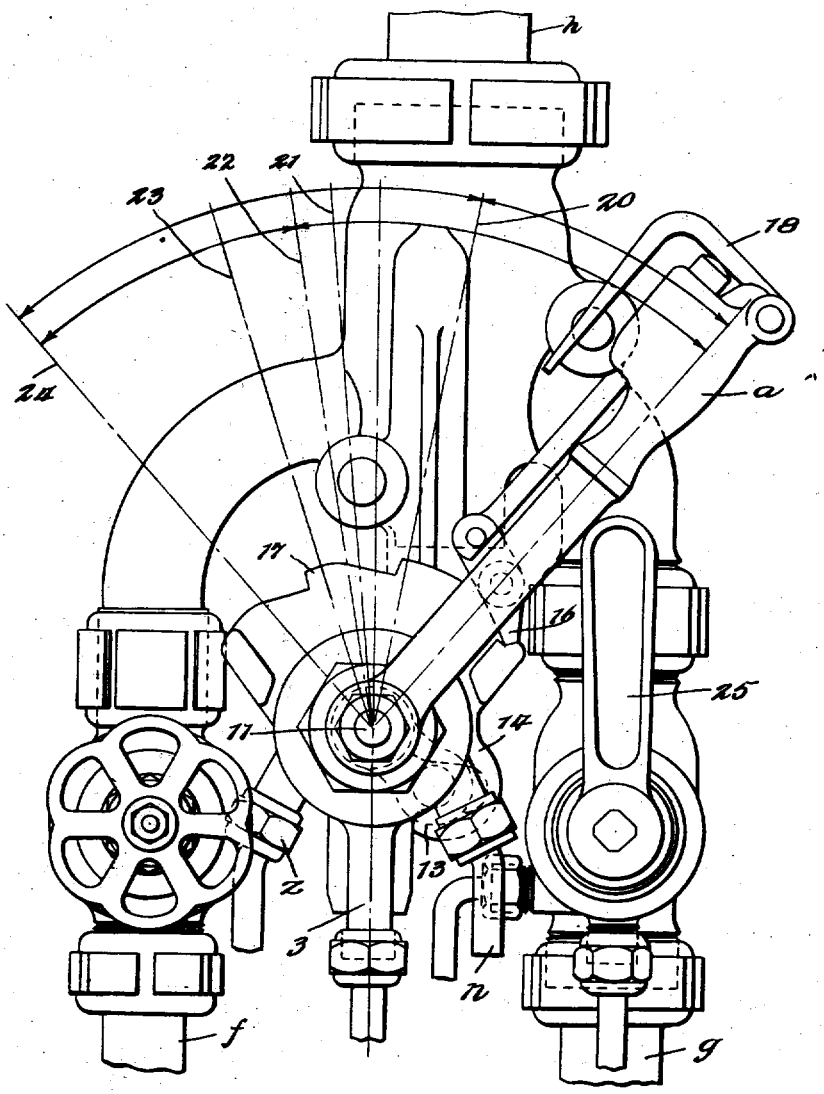
Figures 3, 4:
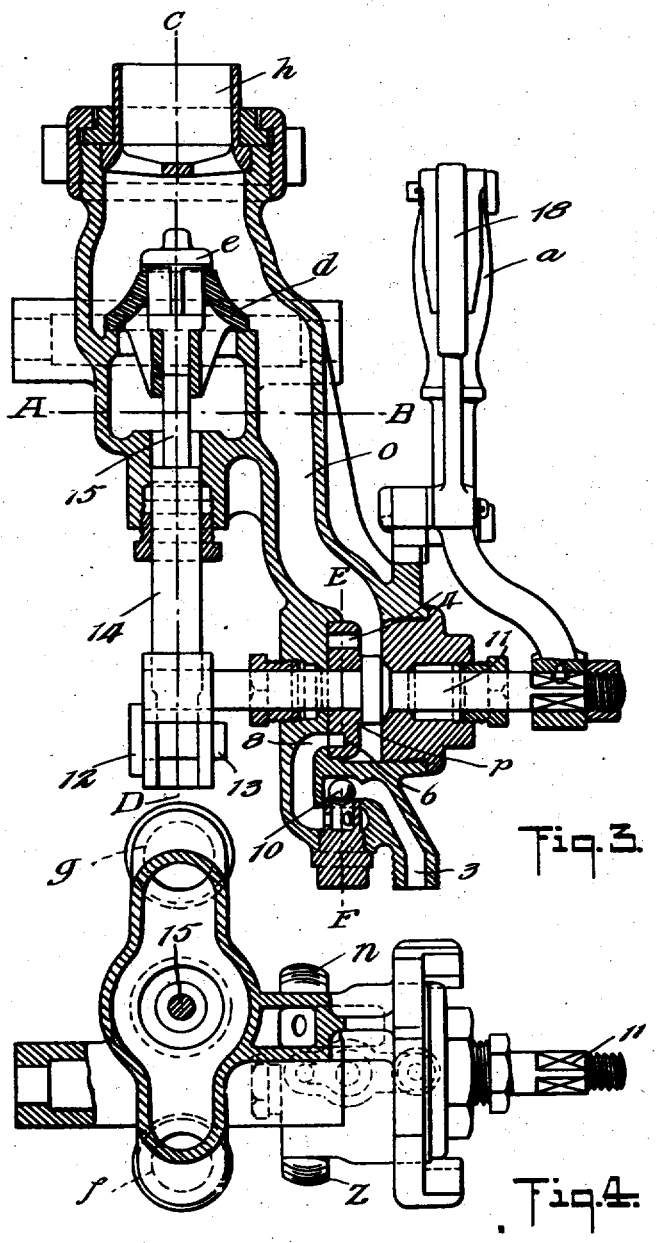
Figure 3 is a sectional elevation, Figure 4 a sectional plan view on the line A B of Figure 3, Figure 5 a sectional elevation on the line C D of Figure 3, Figure 6 a sectional elevation on the line E F, Figure 3, and Figure 7 a detail view illustrating the details of the construction of the control fitting shown in Figures 1 and 2.

There is an atmospheric connection 3 Figures 2, 3 and 6, between the steam connections *n* and *z*. The disc valve has therethrough two ports 4 and 5 and a long recess 6 (see Fig. 7) whilst the seat over which the disc moves has therein three ports 7, 8, 9 (see Figure 6) leading to the connections *z*, 3 and *n* before referred to. A non-return valve 10 on the atmospheric connection 3 prevents any inflow of air to the control instrument.

The spindle 11 which carries the disc valve *p* and is turned by the handle *a*, has a crank arm 12 thereon, the pin 13 of which can engage the hooked lower end of the stem 14. The upper end of the latter serves to open the steam valve *d* whilst the small diameter end 15 of the stem serves to open the pilot valve *e* slightly in advance of the opening of the valve *d*.

The handle *a* has a pawl 16 thereon which co-acts with a fixed ratchet plate 17. The pawl is operated by the trigger arm 18.

The operation of the instrument is as follows:—

With the handle *a* in the position shown in Figure 2, the steam valve *d* and its pilot valve *e* are on their seats, the port 5 in the disc valve *p* is in communication with the port 9 so that steam is passing to the cylinder *k* (Figure 9 or Figure 10) and holding the valve *b* on its seat, the port 7 is in communication with the port 8 by way of the recess 6 in the valve disc so that the chamber *y* beneath the piston *w* is under atmospheric pressure and the water control valve *c* consequently closed. When the handle *a* moves to the position 20, Figure 2, the port 4 comes into coincidence with the port 7 so that steam flows to the water valve control fitting (Figure 8) and opens the said valve, the exhaust steam valve *b* still remaining closed. When the handle *a* reaches the position 21, the pilot steam valve *e* is commencing to open and steam flows therethrough into the injector by way of the passage *f*. Such steam draws the feed water into the injector. The feed water valve *c* remains open and the exhaust steam valve *b* closed. When the handle reaches the position 22, the port 9 commences to come into communication with the atmospheric port 8 by way of the recess 6 in the disc valve and therefore the valve *b* (Figures 9 or 10) will commence to open. Further movement of the handle *a* to the position 23 causes the opening of the main steam valve *d* and with the handle *a* at the position 24, the main steam valve *d* is fully open. If there is no exhaust steam available, the valve controlled by the handle 25 is opened which allows live steam throttled down to about atmospheric pressure to enter the injector to take the place of exhaust steam in the known manner.

In the arrangement illustrated at Figures 11 to 15, we provide for the operation of the valve which controls the supply of throttled down live steam to the injector by the handle *a*. As will be seen by reference to Figure 11, there is a steam valve 26 operated by a stem 27 from a crank arm 28 on the spindle 11, in addition to the valve *d* previously described. The pilot valve *e* is not employed in the Figure 11 construction. In the latter, the valve 26 is adapted to be opened by the handle *a* after the valve *d* has been fully opened. The steam branches *f* and *g* may each be provided with a stop valve 29, 30, see Figures 14 and 15, or the stop valve may be fitted on the pipe connections to said branches.

It will be understood that the steam which passes through the conduit *g* is reduced in pressure by the automatic reducing valve usually provided for the purpose. In the form of instrument illustrated in Figures 1 and 2, the automatic reducing valve is controlled by the handle 25. Such valve, may, however, be arranged in any convenient position between the control instrument and the injector.

Figure 1:
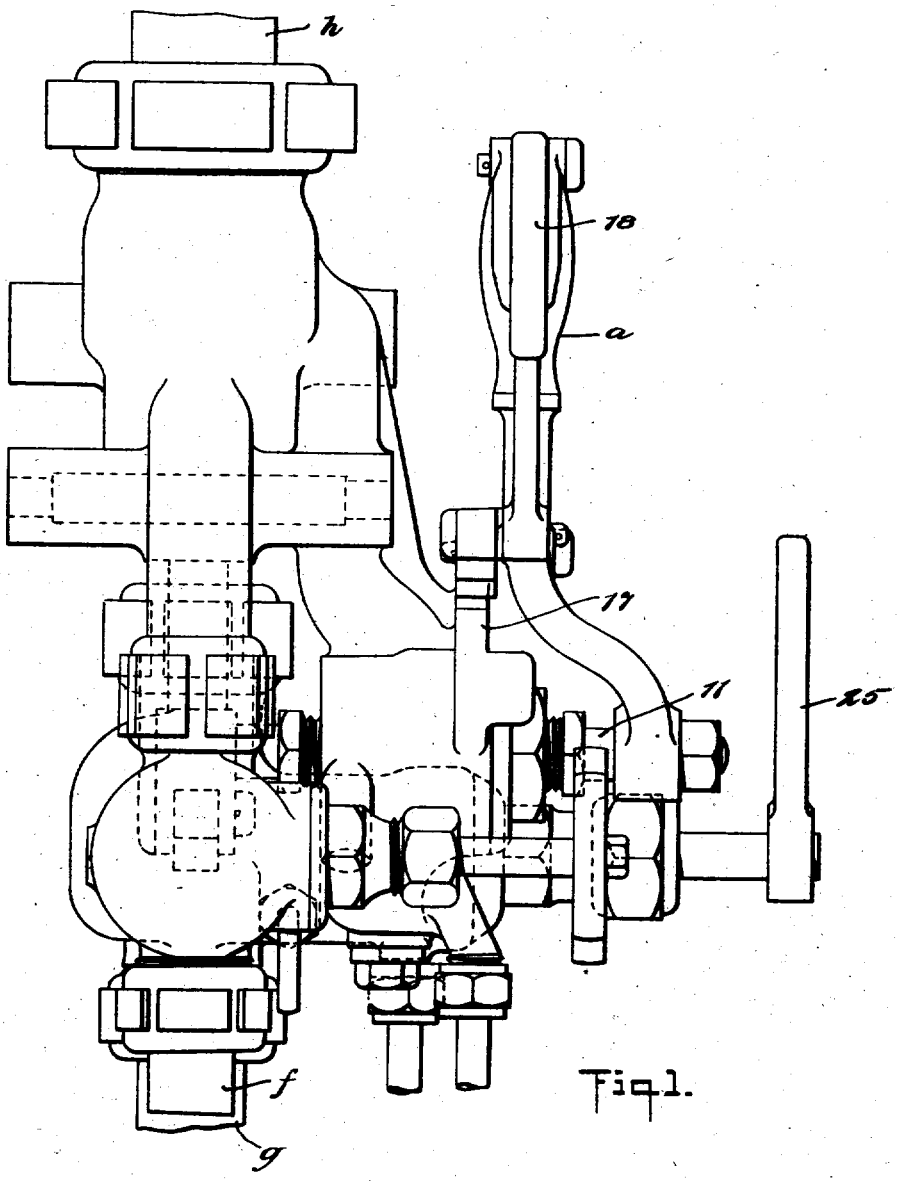
Figure 1 is a front elevation and Figure 2 a side elevation of an exhaust injector control fitting constructed in one convenient form in accordance with our invention.

In Figure 16, the various branches from the control fitting illustrated in Figures 1 and 2 are shown coupled up to the injector which comprises a delivery nozzle 31, a combining nozzle 32 and having a flap 33 thereon, cones 34, 35 and 36 through which the jet issues, a water inlet 37, a supplementary live steam inlet nozzle 38 and an annular space 39 around the nozzle 38 for the admission of live steam throttled down to about atmospheric pressure. The water control fitting illustrated in Figure 8 is shown at 40.

It will be understood that changes, variations and modifications of the construction and arrangement of the parts, and the details thereof, may be resorted to without departing from the principles of our invention as set forth in the claims hereunto appended. We do not claim broadly to be the first inventors of a remote control system for an exhaust steam injector as Malcolm Hard and William A. Buckbee are the first inventors of such a system for which Letters Patent of the United States No. 1,531,004 were granted to them March 24, 1925, we being not the first inventors of anything shown in such Letters Patent.

We claim:—

1. The combination with an exhaust steam injector having conduits connected therewith for supplying to said injector exhaust steam, water, supplementary live steam and auxiliary live steam, and said exhaust steam and water conduits being provided with steam operated valves, of a valve casing located at a point removed from said injector, a pair of valves located within said casing, one for controlling the flow of steam to said steam operated valves and the other for controlling the flow of steam through said supplementary live steam conduit, and a single manually operatable handle for mechanically actuating both of said valves.

2. The combination with an exhaust steam injector having conduits connected therewith for supplying to said injector exhaust steam, water, supplementary live steam and auxiliary live steam, and said exhaust steam and water conduits being provided with steam operated valves, of a valve casing located at a point removed from said injector and a plurality of valves mounted within said casing for controlling the admission of steam directly to said supplementary and auxiliary live steam conduits and to said steam operated valves.

3. The combination with an exhaust steam injector having conduits connected therewith for supplying to said injector, exhaust steam, water, supplementary and auxiliary live steam, and said exhaust steam and water conduits being provided with steam operated valves, of a valve casing located at a point removed from said injector, a plurality of valves mounted in said casing for controlling the admission of steam directly to said supplementary and auxiliary live steam conduits and to said steam operated valves and means for operating said valves in predetermined sequence.

4. The combination with an exhaust steam injector having conduits connected therewith for supplying to said injector, exhaust steam, water, supplementary and auxiliary live steam, and said exhaust steam and water conduits being provided with steam operated valves, of a valve casing located at a point removed from said injector, a plurality of valves mounted in said casing for controlling the admission of steam directly to said supplementary and auxiliary live steam conduits and to said steam operated valves, and a single manually operatable controlling handle for operating said valves in predetermined sequence.

5. The combination with an exhaust steam injector having conduits connected therewith for supplying to said injector, exhaust steam, water, supplementary and auxiliary live steam, and said exhaust steam and water conduits being provided with steam operated valves, of a valve casing located at a point removed from said injector, a plurality of valves mounted in said casing for controlling the admission of steam directly to said supplementary and auxiliary live steam conduits and to said steam operated valves, a single manually operatable controlling handle, and lost motion connecting means between said handle and the valve for said supplementary live steam conduit.

6. The combination with an exhaust steam injector having conduits connected therewith for supplying to said injector, exhaust steam, water, supplementary and auxiliary live steam, and said exhaust steam and water conduits being provided with steam operated valves, of a valve casing having a plurality of valves mounted therein for controlling the admission of steam directly to said supplementary and auxiliary live steam conduits and to said steam operated valves, a manually operatable controlling handle and connections therefrom to the valves of said valve casing to cause the admission of steam to the steam operated valve of said water conduit, to said supplementary live steam conduit and to the steam operated valve of the exhaust steam conduit in the sequence set forth.

7. The combination with an exhaust steam injector having a plurality of conduits connected therewith for supplying to said injector exhaust steam from an engine, water, auxiliary and supplementary live steam and steam operated valves for said water and exhaust steam conduits, of a manually operatable member to control the steam supply to said steam operated valves, pilot and main steam valves for controlling the admission of steam to said supplementary live steam conduit, and mechanical connections therefrom to said manually operatable member.

8. The combination with an exhaust steam injector having a plurality of conduits connected therewith for supplying to said injector exhaust steam from an engine, water, auxiliary and supplementary live steam, and steam operated valves for said water and exhaust steam conduits, of a manually operatable member to control the steam supply to said steam operated valves, pilot and main steam valves for controlling the admission of steam to said supplementary live steam conduit, and means connecting said pilot and main steam valves with said manually operatable member, said connecting means being so constructed and arranged that the operating of said control member will cause said pilot valve to be opened before said main steam valve.

9. The combination with an exhaust steam injector having connected therewith conduits for supplying to said injector, exhaust steam from an engine, water, and live steam, and steam operated valves for controlling the supply of exhaust steam and water to said injector, of a manually operatable member to control the steam supply to said steam operated valves whereby remote control of the injector is effected, pilot and main steam valves for controlling the admission of live steam to said injector and means to operate said pilot and main steam valve from said control member.

10. The combination with an exhaust steam injector, of steam operated exhaust steam and water valves for controlling the supply of exhaust steam and of water to the injector, a manually operatable member adapted to control the steam supply to the steam operated means for said steam and water valves whereby remote control of the injector is effected; pilot and main steam valves and means for operating the same from said manually operatable member whereby the exhaust steam and water supplies of the injector are controlled.

11. The combination with an exhaust steam injector, of steam operated exhaust steam and water valves for controlling the supply of exhaust steam and of water to the injector, a manually operatable member adapted to control the steam supply to the steam operated means for said steam and water valves whereby remote control of the injector is effected; pilot and main steam valves and means for operating the same from said manually operatable member whereby the exhaust steam and water supplies of the injector are controlled, and means whereby the manually operable member also controls the supply of steam for working the injector when exhaust steam is not available.

12. In exhaust injectors having exhaust steam and water inlet valves operated by steam pressure, an improved injector control device comprising a rotatable spindle, a handle secured upon said spindle, a disc type valve carried by said spindle and having ports therein for placing the steam supply connections to the exhaust steam and water valve operating means in communication with the steam supply or with the exhaust, a valve for supplying live steam to the injector for increasing its delivery pressure, and connecting means between said spindle and said live steam supply valve, whereby said live steam valve will be operated by the rotation of said spindle.

13. An apparatus as claimed in claim 12 wherein means are provided for supplying steam to the injector to take the place of exhaust steam when the latter is not available as set forth.

14. The combination with an exhaust steam injector having connected therewith conduits for supplying to said injector, exhaust steam from an engine, water and live steam, and steam operated valves for controlling the supply of exhaust steam and water to said injector, of a manually operable member to control the steam supply to said steam operated valves whereby remote control of the injector is effected, a live steam supply valve and mechanical connections between said manually operable member and said live steam supply valve to cause said valve to be operated by said member.

15. The combination with an exhaust steam injector having connected therewith conduits for supplying to said injector, exhaust steam from an engine, water and live steam, and steam operated valves for controlling the supply of exhaust steam and water to said injector, of a manually operable member to control the steam supply to said steam operated valves whereby remote control of the injector is effected, a live steam supply valve and a lost motion connection between said member and live steam supply valve.

RICHARD DAVID METCALFE.
JAMES CROXON METCALFE.